Aug. 4, 1942.

M. E. BARKER 2,291,603

OUTLET VALVE FOR GAS MASKS

Filed July 19, 1940

INVENTOR
MAURICE E. BARKER
BY Millard F. Peake
ATTORNEY

Aug. 4, 1942.  M. E. BARKER  2,291,603
OUTLET VALVE FOR GAS MASKS
Filed July 19, 1940   2 Sheets-Sheet 2

INVENTOR
MAURICE E. BARKER
BY: Millard F. Peake
ATTORNEY

Patented Aug. 4, 1942

2,291,603

UNITED STATES PATENT OFFICE 2,291,603

OUTLET VALVE FOR GAS MASKS

Maurice E. Barker, Washington, D. C.

Application July 19, 1940, Serial No. 346,259

4 Claims. (Cl. 251—119)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to outlet valves for gas masks, respirators and similar devices.

Gas masks and respirators include a facepiece covering all or a part of the face of the wearer so arranged that inspired air is drawn through a purifying device to extract harmful gases and dusts. Exhaled air enters the space between the face and the facepiece and then escapes through an outlet valve.

Outlet valves of this type must form a tight seal with its seat upon inhalation, so that all inspired air must pass through the air purifier, yet the valve must open readily with minimum resistance upon exhalation.

One-way valves of this type have been used on gas masks for many years, but all prior known valves have some defect, such as high resistance to exhalation, leakage on inhalation, corrosion or other deterioration during storage or use, and excessive weight or size.

The present invention provides a simple valve capable of quantity production which is durable and reliable in use, forms an air-tight seal upon inhalation, opens without sticking and in response to slight pressure of exhalation, and is otherwise generally suitable for use with gas masks.

Referring to the accompanying drawings

Figure 1:
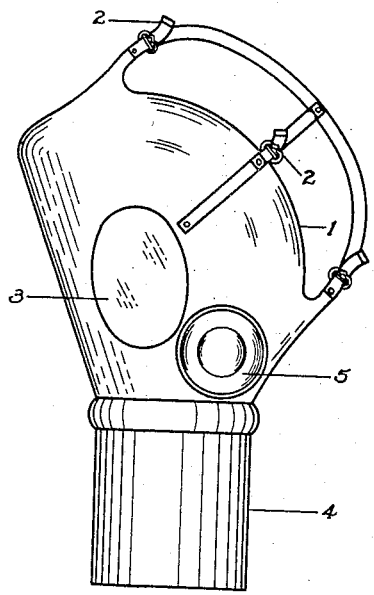
Figs. 1 and 2 are side and front elevations of one form of gas mask facepiece having this improved valve thereon.
Figure 2:
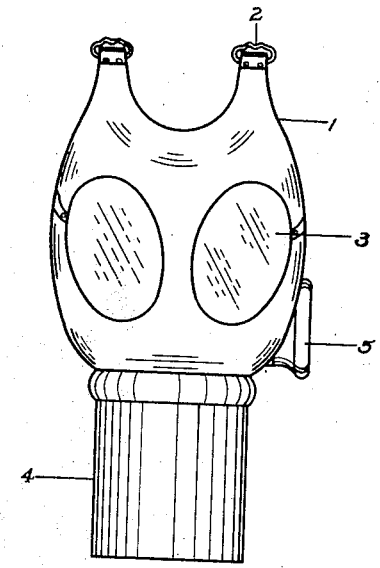
Figure 3:
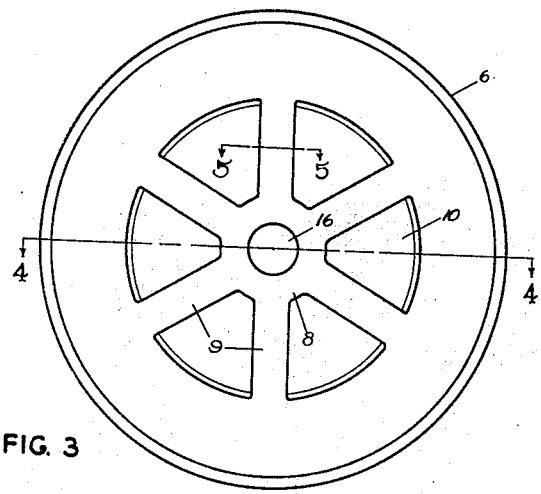
Fig. 3 is top plan of the valve seat.

Referring to Figs. 1 and 2 of the drawings, which illustrates the relative position of the outlet valve in combination with a gas mask, the gas mask facepiece 1 has an elastic head harness 2 connected therewith and is provided with lenses 3 of any approved form. An air purifying canister 4 is secured to the lower portion of the facepiece. Just above the canister 4 and at the lower cheek portion, is mounted the outlet valve designated generally as 5. By thus positioning the outlet valve near the lower portion of the facepiece, and to one side, drainage of perspiration from the facepiece may take place through the valve and the valve does not interfere with the normal operations of the wearer.

Referring now to the detailed construction of the valve and its seat, it will be understood that Figs. 3 to 15 show the valve greatly enlarged. Actually in use the valve will preferably be approximately ⅓ to ½ the size shown on the drawings. In Figs. 3 to 6 inclusive, the valve seat proper comprises an annular member 6 molded from cellulose acetate, cellulose nitrate, phenolic condensation product, such as "Bakelite" or similar plastic which may be readily molded to shape. This valve seat has a rim portion 7 with a central ring member 8 connected to the rim 7 by a plurality of spider members 9, thus providing a series of spaced openings 10 through which air may pass.

Figure 5:
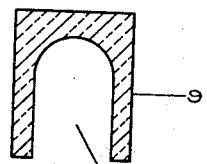
Fig. 5 is a section on line 5—5 of Fig. 3.
Figure 4:
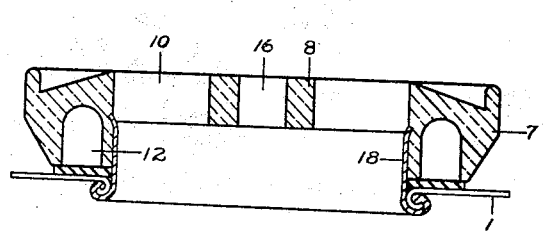
Fig. 4 is a section on line 4—4 of Fig. 3.

Molded integrally with the seat member 6 is a metal ferrule 18 which projects downward below the valve seat. The flexible facepiece 1 may be secured to the ferrule 18 to thus mount the complete valve in the gas mask, the member 18 furthermore serving to prevent buckling or deformation of the valve seat. As seen in Figs. 4 and 5, the rim member 7 and the spider members 9 are hollowed out as shown by numeral 12 during molding. This is for the purpose of making the member lighter in weight. At the outer edge of the rim 7 an upstanding flange is provided to protect the valve disk from injury during use. The valve is assembled to the facepiece as shown in Fig. 4, it being understood that all forms of this invention may be assembled similarly. A washer is placed beneath the rim 7, ferrule 18 is passed through an opening in the facepiece smaller than the ferrule, and ferrule 18 is then crimped as shown. This results in a strong gas-tight seal.

Figure 6:
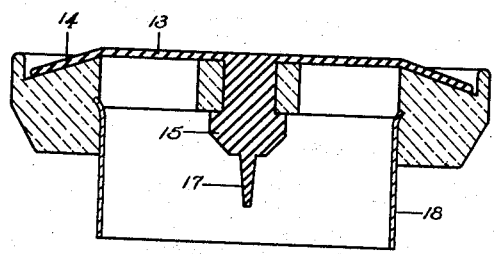
Fig. 6 is a section, similar to Fig. 4, of a modified form of valve, with the valve disk in place.

Referring now to Fig. 6, the valve disk comprises the molded member 13 slightly dished into a cup form. This valve is formed of thin flexible rubber having a rim 14 at a slight downward angle to the main portion thereof. At its center the valve disk 13 has integrally formed therewith a depending button or head 15 adapted to project through the central opening 16 of the seat and to form a tight closure at this point to prevent passage of air. The button 15 has a lower head slightly larger in diameter than the main portion thereof, so as to retain the valve disk in place as shown in Fig. 6. It will be noted that the seat 6 has a configuration on its upper surface of the valve member, whereby the thin valve rests upon the spider members 9 throughout their entire length and then slants downwardly to follow the corresponding surface of the seat.

The seat 6 having been assembled to a gas mask facepiece such as shown in Figs. 1 and 2, the flexible valve disk 13 is associated therewith by forcing the button 15 through the opening 16 until the enlarged head thereof is in the position shown in Fig. 6. Button 15 then expands to completely seal the opening 16 in the seat. Preferably button 15 is provided with an extension 17 which may be grasped with the fingers in order to pull the button into place. The length of button 15 between the enlarged lower head and the main portion 13 thereof is slightly less than the thickness of the ring 8. Thus when the valve is being inserted, by pull on extension 17, the button is stretched and when released it spreads into firm contact with the ring 8 to form a tight seal and to resiliently pull the valve member downwardly upon its seat. The valve may be readily removed from its seat for replacement in case of damage. The portion 14 of the disk rests in flat surface engagement with the seat, thus providing a surface contact extending the full depth of the annular portion 14 of the valve. This extended surface provides a positive seal which does not leak upon inhalation. Upon exhalation the thin valve member 13 bends upwardly to allow air to escape through the openings provided by the spiders 9. The resistance to exhalation is reduced to a minimum due to the fact that the valve member is of very thin, soft and flexible rubber which opens readily upon slight air pressure.

Referring to the modification shown in Figs. 7 to 11, the valve seat is substantially the same as shown in Figs. 3 to 6, with the exception of the metal ferrule 18 which has an upper flange 19 bent back upon itself. This results in the stronger assembly of the parts during molding of the plastic base 6. The base 6 is otherwise similar to that shown in Figs. 3 to 6, except that the outer annular portion thereof is not cut away as shown in Fig. 4. This is done in order to allow ample material in which the flange 19 may be imbedded.

Figure 7:
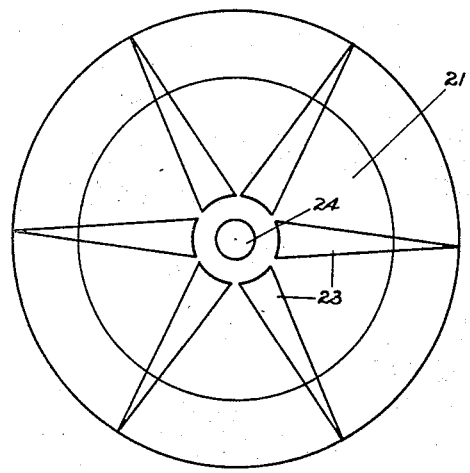
Figs. 7 and 8 are top plan and central section of a modified form of valve disk.
Figure 8:
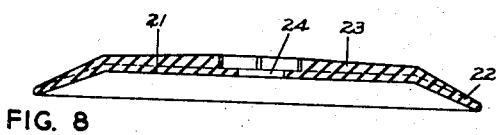

The valve disk of this form of the invention comprises a thin flexible rubber member 21 as seen in Figures 7 and 8 which is molded to a cup formation. The valve disk has a substantially flat bottom throughout a portion of its diameter, and a rim portion 22 bent downwardly at an angle to the main body thereof. On its upper surface the valve 21 has a plurality of radiating fins 23 which are progressively narrower as they approach the outer rim of the valve and are progressively of less height. These ribs or fins 23 are for the purpose of stiffening and strengthening the valve disk to provide a more positive pressure while the valve is closed, and yet are sufficiently flexible to allow ready opening of the valve in response to exhalation.

As seen in Fig. 8, the ribs 23 do not extend to the center of the disk. At its center the valve disk is provided with an opening 24. The valve is assembled to its seat by a separate button member 25 shown in Fig. 9. Button 25 has an overhanging flange 26 at its upper end and an enlarged head 27 at its lower end. The space between the flange 26 and the enlarged head 27 is slightly greater than the thickness of the rim 8 on the valve seat.

Figure 11:
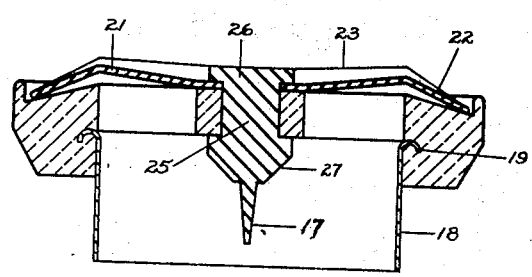
Fig. 11 is an assembled section of this same form of the invention.

The valve is assembled to its seat as shown in Fig. 11. It will be noted that the angularity of the rim portion 22 of the valve is slightly greater than the corresponding portion on the seat. Thus the valve normally makes a line or rim contact with its seat instead of the flat surface contact heretofore described. In this form, assembly may be accomplished either by previously inserting the button 25 into its seat by grasping the projection 17 and then stretching the valve 21 over the flange 26, or by first assembling the valve with the button 25 and then placing this assembly into the valve seat. The arrangement of a separate button as shown in this form of the invention simplifies the molding operation. The rubber button need not be discarded when a new valve must be inserted.

When this form of valve is in use, the slight tension caused by the central button 25 pulls the valve downwardly to a slightly deformed position as shown in Fig. 11 causing a circular line contact of the valve on its seat. Upon exhalation, air passing between the spider members readily forces the disk to bend upwardly. Upon inhalation, the valve 21 is pulled slightly inwardly so that the line contact gradually changes to a surface contact progressively in accordance with the vacuum within the gas mask.

Figure 12:
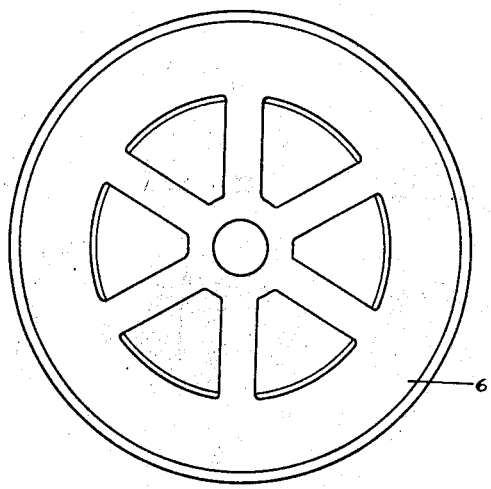
Figs. 12 and 13 are a top plan and central section of modified form of seat.
Figure 13:
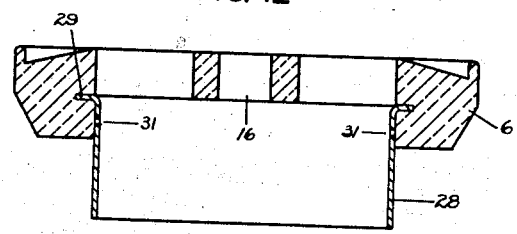
Figure 9:
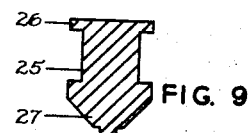
Fig. 9 is a section of the connecting plug used therewith.
Figure 10:
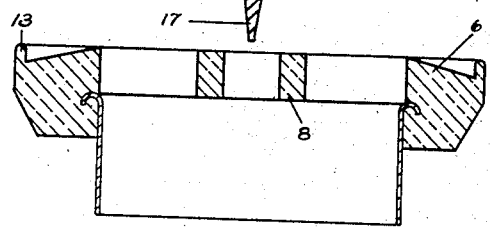
Fig. 10 is a section of the valve seat of this form.

Referring now to Figs. 12 and 13, the valve seat shown resembles that of the form shown in Figs. 10 and 11, with the exception of the ferrule 28 which has a straight outwardly extending flange 29 for molding into the plastic seat 6. Furthermore, the ferrule 28 has a plurality of openings 31 near the upper rim thereof and below the flange 29 so that the material of the seat 6 passes into these openings during molding. By this construction a stronger uniting of the ferrule 28 in the seat 6 is obtained. It will be understood that the different configurations of the ferrules shown may be used with the various modifications of the valves and seats.

Figure 14:
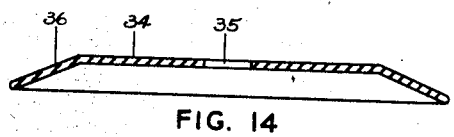
Figs. 14 and 15 are a section of a modified valve disk and a section of its seat.
Figure 15:
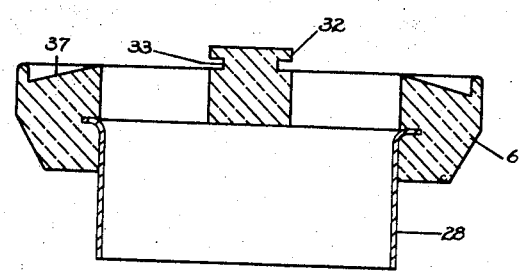

Figs. 14 and 15 illustrate another modification wherein the use of a soft rubber button is eliminated. In this form, the base 6 has the ferrule 28 molded therewith as in the previous forms. At its center the seat is not provided with an opening, but has an upstanding portion 32 with an undercut 33. The valve 34 is molded to cup formation and has a central opening 35 of slightly less diameter than that of the undercup portion 33 upon the valve seat. In order to assemble this valve, it is merely necessary to slip the opening 35 of the valve over the portion 32 of the seat and allow the valve to snap into place. Preferably the angular rim portion 36 of the valve extends downwardly at a slightly greater angle than the corresponding portion 37 on the seat to give a line contact similar to that shown in Fig. 11. This form of the invention is cheaper to manufacture than the previous forms, and is readily assembled and disassembled.

The various forms of invention herein shown represent detailed improvements over prior known valves for specific use with gas masks used for protection in time of war. The necessity for absolute and positive sealing of the valve under all conditions of use, the lowering of resistance to opening even to a small degree, a conservation of rubber which is a vital and critical material in time of war, and the adaptation for quantity production by modern high-speed methods, all make the improvements herein described of importance to the art of gas mask manufacture. It will be understood that the various forms of invention shown may be combined one with the other, for example, the valve disk of Figs. 14 and 15 may have a surface contact such as shown in Fig. 6. Also this valve disk may have molded thereon the ribs 23 as shown in Figs. 7 and 8. Various other combinations of the forms shown are within the scope of this invention.

I claim:

1. An exhalation valve of the type embodying a tubular seat-member, a flexible closing disc, and means for holding the disc by elastic tension at the center thereof on said seat-member, and characterized by having said member rigid and of molded plastic material, and a sheet metal ferrule molded integrally with said seat member, with one end of the ferrule projected beyond a corresponding end of the seat-member to be crimped onto the facepiece of a gas mask to form a strong, gas-tight seal therewith circumjacent the breathing opening of the facepiece.

2. An exhalation valve seat consisting of a rigid, tubular plastic body provided at one end with a seating surface and also with means for holding a flexible closing disc on the body by elastic tension at the center of the disc, and at its opposite end provided with a sheet metal ferrule molded to said body and having an exposed end portion adapted to be crimped onto the material of a gas mask facepiece at the edge thereof defining the breathing opening in the facepiece to effect a mounting of the valve on the facepiece.

3. An exhalation valve for gas masks comprising a plastic tubular member having at one end a seating surface and a centrally positioned closing disc-retaining button, a flexible closing disc removably overlying said end of the tubular member and having a peripheral bearing surface for contact with said seating surface, and a central portion provided with an aperture through which said button extends, said button having a part at its outer end adapted to lie centrally on the closing disc to hold the latter in position on the tubular member and an attaching ferrule of sheet metal having an end secured within the tubular member and an exposed end adapted to be inserted in the facepiece of a gas mask through the breathing opening thereof and then crimped onto the material of the facepiece at the edge defining the breathing opening.

4. An exhalation valve for gas masks comprising a rigid tubular member provided with a centrally positioned apertured boss and a seating surface circumjacent the boss, a flexible closing disc having a peripheral bearing surface for rest on said seating surface and a central portion provided with an aperture for registry with said boss, and an elastic button detachably securing the closing disc on said tubular member, said button having a shank snugly fitted in the boss and the aperture of the closing disc aligned with said boss, a head on one end of the shank in pressure-contact with the front of the closing disc, and a head on the opposite end of the shank in pressure-contact with the back of the boss, whereby tension is exerted centrally against the closing disc.

MAURICE E. BARKER.